United States Patent
Vega Velazquez et al.

(10) Patent No.: US 9,987,779 B2
(45) Date of Patent: Jun. 5, 2018

(54) INTEGRAL LOCATOR PIN FOR A PLASTIC COMPONENT

(71) Applicant: FORD GLOBAL TECHNOLOGIES, LLC, Dearborn, MI (US)

(72) Inventors: Sergio Alberto Vega Velazquez, Nicolas Romero (MX); Jorge Jara Zambrano, Atizapán de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 14/742,770

(22) Filed: Jun. 18, 2015

(65) Prior Publication Data

US 2016/0368188 A1    Dec. 22, 2016

(51) Int. Cl.
*B29C 45/00*    (2006.01)

(52) U.S. Cl.
CPC .................. *B29C 45/0025* (2013.01)

(58) Field of Classification Search
CPC .................................... B29C 45/0025
USPC ........... 428/397; 52/716.6, 718.05, 846, 851, 52/855, 718.04
See application file for complete search history.

(56) References Cited

U.S. PATENT DOCUMENTS

| 5,413,833 A | 5/1995 | Hernandez et al. |
| 6,068,896 A | 5/2000 | Manabe et al. |
| 2009/0042445 A1* | 2/2009 | Ichio ................. H01R 13/4361 439/626 |

FOREIGN PATENT DOCUMENTS

| EP | 2023445 A2 | 11/2009 |
| JP | H03207617 | 9/1991 |
| JP | 07276445 | 10/1995 |
| JP | 2001315154 | 11/2001 |
| JP | 2005067564 | 3/2005 |
| JP | 2013176958 | 9/2013 |

OTHER PUBLICATIONS

English machine translation for JP03207617.
English machine translation for JPH07276445.
English machine translation for JP2001315154.
English machine translation for JP2005067564.
English machine translation for JP2013176958.

* cited by examiner

*Primary Examiner* — William P Watkins, III
(74) *Attorney, Agent, or Firm* — Vichit Chea; King & Schickli, PLLC

(57) ABSTRACT

A locator pin is provided for a plastic component. The locator includes a main rib, a first secondary rib intersecting the main rib at a first intersection and a second secondary rib intersecting the main rib at a second intersection. The first and second intersections are offset from each other. A plastic component incorporating the locator pin, a plastic component assembly incorporating that plastic component and a method of reducing sink marks in an injection molded plastic component are also provided.

7 Claims, 6 Drawing Sheets

INTEGRAL LOCATOR PIN FOR A PLASTIC COMPONENT

TECHNICAL FIELD

The present invention relates generally to the field of injection molding and, more particularly, to a new and improved integral locator pin for an injection molded plastic component as well as to a plastic component incorporating such a locator pin, a plastic component assembly incorporating such a locator pin and a method of reducing sink marks in an injection molded plastic component including a locator pin.

BACKGROUND

A locator pin is a feature utilized to locate two components with respect to each other. As illustrated in FIGS. 1 and 2, a first component $C_1$ includes the locator pin P while the second component $C_2$ includes a tight clearance hole or aperture A that is aligned with and receives the locator pin when the two components are secured together. As illustrated, the prior art locator pin P includes two perpendicular ribs R that define a cross-shaped cross section.

One problem associated with the utilization of a cross-shaped locator pin P as illustrated in FIGS. 1 and 2 is that such a pin causes a sink mark M in the opposite side or A face (referenced herein as F) of component $C_1$. See FIG. 3 illustrating the sink mark M. As should be appreciated, the sink mark M comprises a visible surface depression on the smooth surface F of a plastic component $C_1$. This is due to the local thickening of the area at the intersection of the locator pin P, increasing the internal mass at that point. This increased internal mass retains heat during the injection molding process, maintaining the zone or area in a plastic state so that the material draws inward and contracts as cooling proceeds.

Various attempts have been made in the past to either eliminate or minimize the effect of such a sink mark M. For example, the smooth A surface or face F is sometimes textured in order to camouflage a sink mark. In another approach, the plastic part is thickened in the region around the locator pin P so that the thickness of the locator pin ribs R is substantially less than the thickness of the intersected section of the plastic component $C_1$.

Although these methods have worked successfully in some applications, most of the time they have to be combined and, in some cases, combination is not enough to effectively eliminate a sink mark M. Further, there are also some cases in which it is impractical to modify the texture of the A surface, or the required thickening in the region around the locator pin P is too great and can lead to other problems. Thus, there exists a need to develop a new locator pin structure and/or a method to eliminate or reduce sink marks in plastic components incorporating a locator pin.

This document relates to a new and improved locator pin, a plastic component incorporating the locator pin, a plastic component assembly relying on the new and improved locator pin and a new and successful method to reduce sink marks in an injection molded plastic component including a locator pin.

SUMMARY

In accordance with the purposes and benefits described herein, a locator pin is provided for a plastic component. That locator pin comprises a main rib, a first secondary rib intersecting the main rib at a first intersection and a second secondary rib intersecting the main rib at a second intersection wherein the first intersection is offset from the second intersection. The main rib may include a first face and a second face wherein the first secondary rib intersects the first face and the second secondary rib intersects the second face. In one possible embodiment, the first secondary rib extends from the main rib in a first direction while the second secondary rib extends from the main rib in a second direction. In one possible embodiment, the first direction is opposite the second direction. Further, the first face is opposite the second face.

In one possible embodiment, the main rib has a width axis A, the first intersection extends along the width axis A for a length $L_1$, the second intersection extends along the width axis A for a length $L_2$ and the first intersection is spaced from or offset from the second intersection along the width axis A by a length $L_3$ where $L_3 > L_1 + L_2$.

In accordance with an additional aspect, a plastic component is provided incorporating the locator pin described in this document.

In accordance with yet another aspect, a plastic component assembly is provided. That plastic component assembly comprises a first plastic workpiece including a locator pin having a main rib, a first secondary rib intersecting the main rib at a first intersection and a second secondary rib intersecting the main rib at a second intersection wherein the first intersection is offset from the second intersection. Further, the plastic component assembly includes a second plastic workpiece including a four sided clearance aperture for receiving and holding the locator pin when the first plastic workpiece and second plastic workpiece are connected together.

The main rib may include a first face and a second face wherein the first secondary rib intersects the first face and the second secondary rib intersects the second face. In one possible embodiment, the first secondary rib extends from the main rib in a first direction and the second secondary rib extends from the main rib in a second direction. The first direction may be opposite the second direction and the first face may be opposite second face.

Further, the main rib may have a width axis A wherein the first intersection extends along the width axis A for a length $L_1$, the second intersection extends along the width axis A for a length $L_2$ and the first intersection is spaced or offset from the second intersection along the width axis by a length $L_3$ where $L_3 > L_1 + L_2$.

In accordance with still another aspect, a method is provided for reducing sink marks in an injection molded plastic component including a locator pin. That method may be broadly described as comprising the forming of the locator pin with a main rib, a first secondary rib intersecting the main rib at a first intersection and a second secondary rib intersecting the main rib at a second intersection wherein the first intersection is offset from the second intersection along a width axis A of the main rib. Still further, the method may include forming the first intersection to extend along the width axis A for a length $L_1$, forming the second intersection to extend along the width axis A for a length $L_2$ and forming the first and second intersection so as to be offset along the width axis A for a length $L_3$ where L3 $L_3 > L_1 + L_2$.

In the following description, there are shown and described several preferred embodiments of the locator pin for a plastic component, a plastic component, a plastic component assembly incorporating the plastic component and a method of reducing sink marks in an injection molded plastic component including a locator pin. As it should be realized, the locator pin, the plastic component, the plastic component assembly and the method are capable of other, different embodiments and their several details are capable of modification in various, obvious aspects all without departing from the locator pin, plastic component, plastic component assembly and method as set forth and described in the following claims. Accordingly, the drawings and description should be regarded as illustrative in nature and not as restrictive.

BRIEF DESCRIPTION OF THE DRAWING FIGURES

The accompanying drawing figures incorporated herein and forming a part of the specification, illustrate several aspects of the locator pin, plastic component and plastic component assembly and together with the description serve to explain certain principles thereof. In the drawing figures.

Reference will now be made in detail to the present preferred embodiments of the locator pin, plastic component and plastic component assembly, examples of which are illustrated in the accompanying drawing figures.

DETAILED DESCRIPTION

Figure 1:
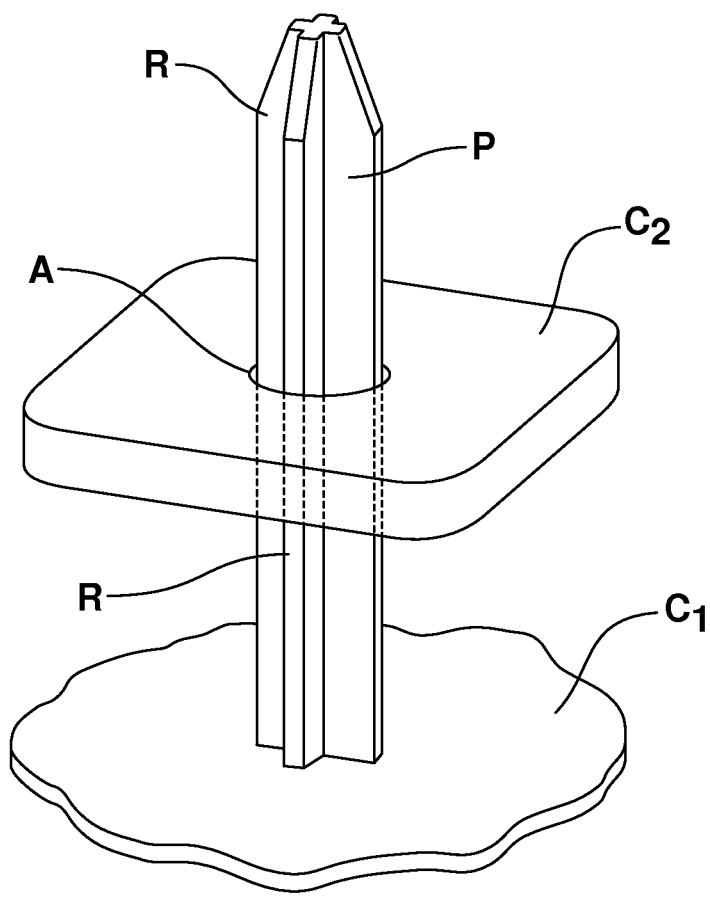
FIG. 1 is a perspective view of a prior art plastic component assembly incorporating a first plastic component having an integral locator pin with a cross-shaped cross-section and a second plastic component having a mating clearance aperture for receiving the locating pin.
Figure 2:
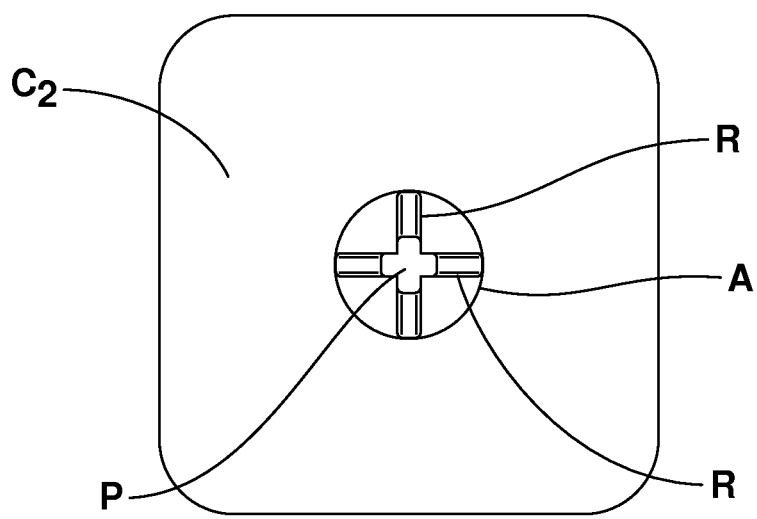
FIG. 2 is a top plan view of the connected components illustrated in FIG. 1 showing the locator pin received in the clearance aperture.
Figure 3:
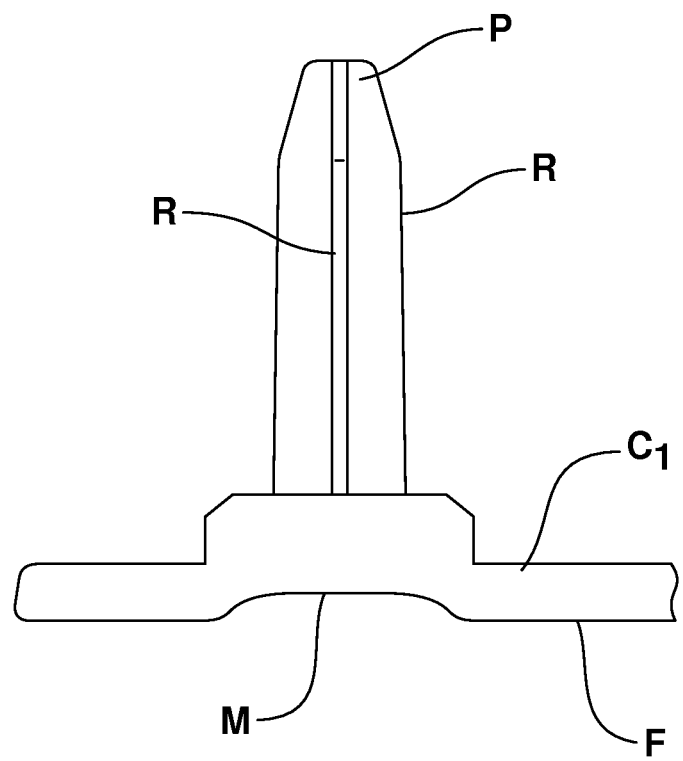
FIG. 3 is a detailed, cross-sectional view of the first prior art component illustrated in FIGS. 1 and 2 showing the presence of a sink mark in the A face of the first component opposite the locating pin provided on the B face of the component.
Figure 4:
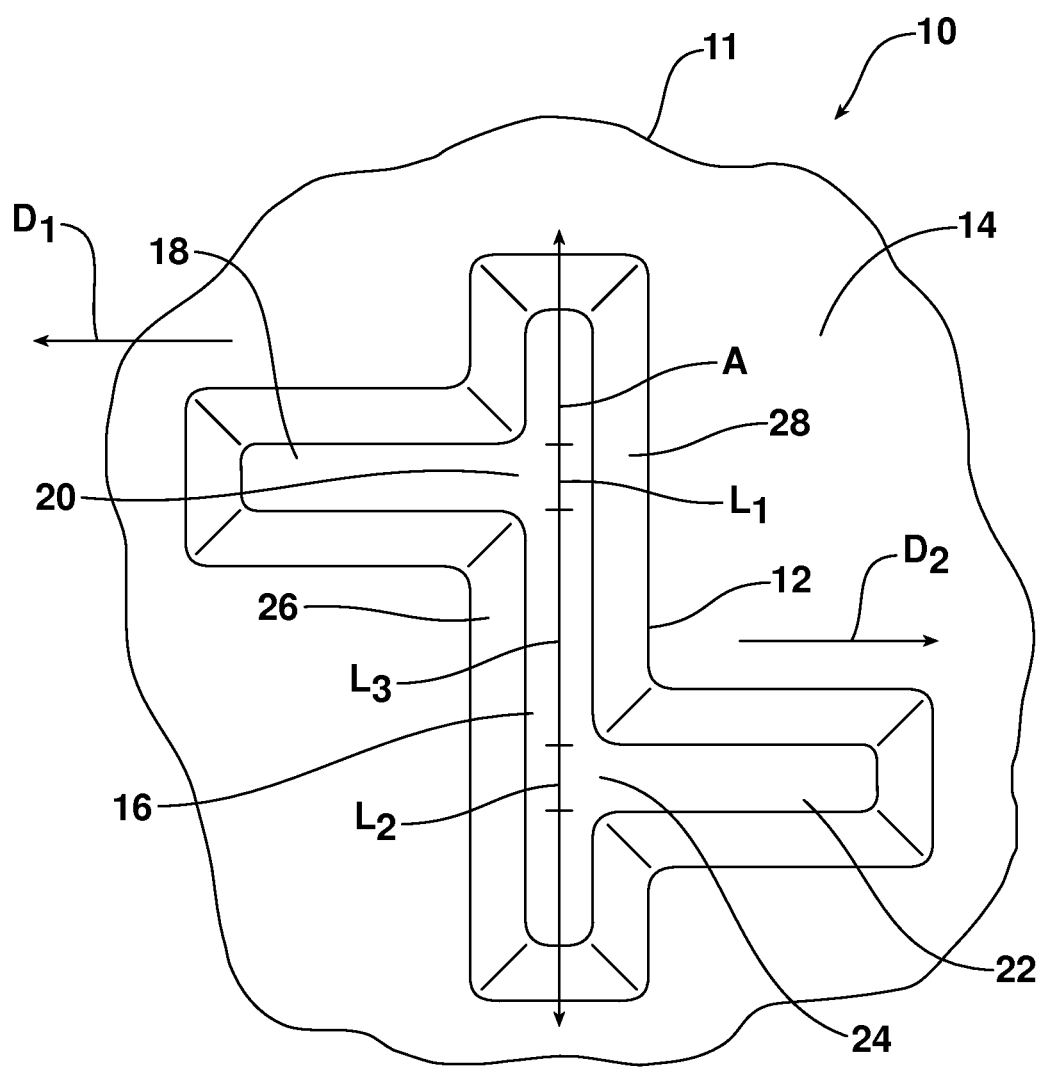
FIG. 4 is a top plan view of a plastic component incorporating the new and improved locator pin that is the subject matter of this document.
Figure 5:
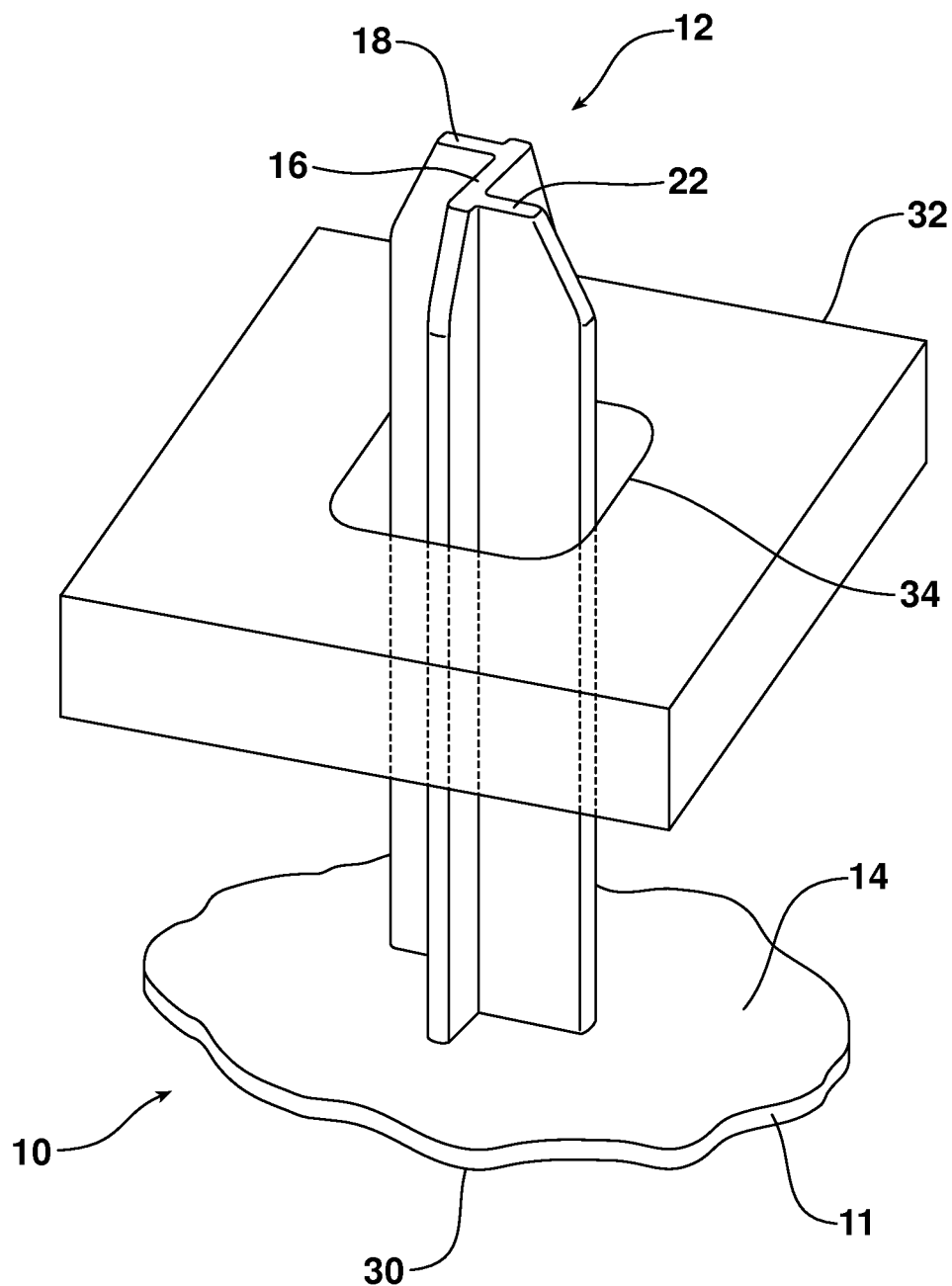
FIG. 5 is a perspective view illustrating a plastic component assembly including a first component incorporating the integral locator pin of this document and a second component incorporating a four-sided clearance aperture for receiving that locating pin.

Reference is now made to FIG. 4 illustrating a new and improved plastic component 10 incorporating the new and improved locator pin 12. As illustrated in FIGS. 4 and 5, the locator pin 12 is integrally formed on the rear or B face 14 of the main body 11 of the plastic component 10 by injection molding or other means. The locator pin 12 includes a main rib 16, a first secondary rib 18 intersecting the main rib at a first intersection 20 and a second secondary rib 22 intersecting the main rib at a second intersection 24.

More specifically, the main rib 16 includes a first face 26 and a second face 28. In the illustrated embodiment, the first face 26 and second first face 28 are opposed to one another. The first secondary rib 18 intersects the first face 26 while the second secondary rib 22 intersects the second face 28. As illustrated, the first secondary rib 18 extends from the main rib 16 in a first direction while the second secondary rib 22 extends from the main rib in a second direction. In the illustrated embodiment, the first direction $D_1$ is opposite the second direction $D_2$.

Still more specifically, as best illustrated in FIG. 4, the main rib 16 has a width axis A. The first intersection 20 is located along the axis A for a length $L_1$. The second intersection 24 extends along the axis A for a length $L_2$. Further, the first intersection 20 is spaced or offset from the second intersection 24 along the longitudinal axis A by a length $L_3$ where $L_3 > L_1 + L_2$.

As should be appreciated, the new locator pin 12 is non-symmetric and includes only one rib 18, 22 at each intersection 20, 24. This configuration effectively reduces material accumulation at the interface of the locator pin 12 and the B face 14 by 15%, decreasing the potential for formation of a sink mark in the A surface 30 opposite the locator pin by the same percentage.

Figure 6:
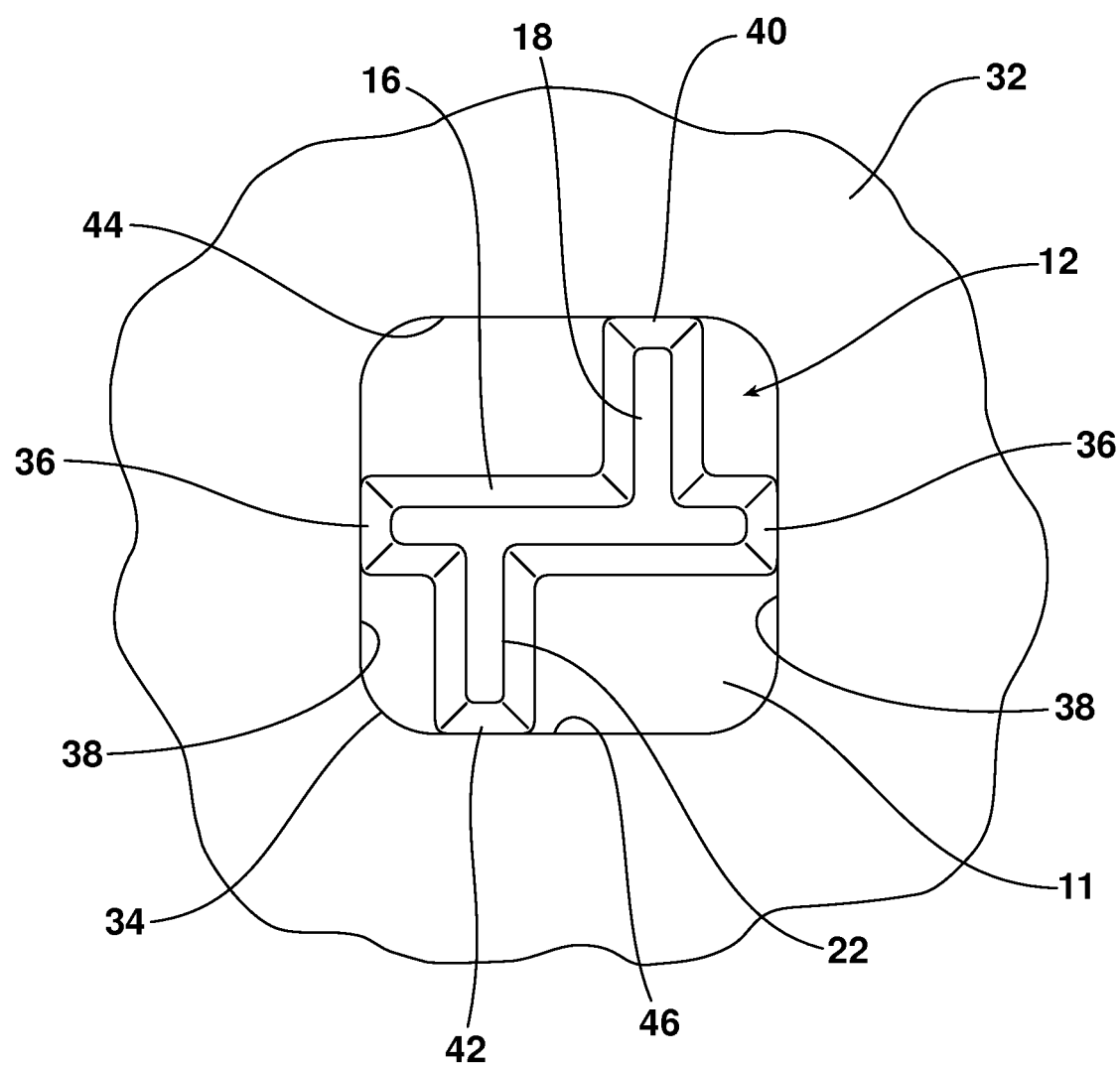
FIG. 6 is a top plan view illustrating how the new locator pin is received in that clearance aperture.

Reference is now made to FIGS. 5 and 6, illustrating a plastic component assembly including a first plastic workpiece or component 10 including the locator pin 12, as best illustrated in FIG. 4 and described above, and a second plastic workpiece 32 including a four-sided clearance aperture 34 for receiving and holding the locator pin 12 when the first and second workpieces 10, 32 are joined together. As best illustrated in FIG. 6, the two opposed edges 36 of the main rib 16 engage opposite walls 38 of the clearance aperture 34 while the two offset opposed edges 40, 42 of the secondary ribs 18, 22 engage the respective opposed walls 44, 46 of the clearance aperture 34. More specifically, the edge 40 of the first secondary rib 18 engages the wall 44 while the edge 42 of the second secondary rib 22 engages the wall 46. As illustrated, the ribs 16, 18, 22 are tapered at the distal end of the pin 12 to allow free insertion of the locator pin into the aperture 34. However, minimal clearance exists between the edges 36, 40, 42 of the locator pin 12 and the walls 38, 44, 46 of the clearance aperture 34 so as to limit play, noise and vibration in the X and Y directions.

Also disclosed is a method of reducing sink marks in an injection molded plastic component 10 including a locator pin 12. That method includes the step of forming the locator pin 12 with a main rib 16, a first secondary rib 18 and a second secondary rib 22. The first secondary rib 18 intersects the main rib 16 at a first intersection 20 and the second secondary rib 22 intersects the main rib at a second intersection 24. The first intersection 20 is offset from the second intersection 24 along an axis A of the main rib 16. The method may also include the steps of forming the first intersection 20 to extend along the axis for a length $L_1$, forming the second intersection 24 to extend along the axis A for a length $L_2$ and forming the two intersections so as to be offset from each other along the axis A by a length $L_3$ where $L_3 > L_1 + L_2$.

The foregoing has been presented for purposes of illustration and description. It is not intended to be exhaustive or to limit the embodiments to the precise form disclosed. Obvious modifications and variations are possible in light of the above teachings. For example, while the illustrated embodiment includes an offset length $L_3$ greater than the first intersection length $L_1$ plus the second intersection length $L_2$ along the axis A of the main rib 16, $L_3$ could be greater than $L_1$ and greater than $L_2$ but not greater than $L_1$ plus $L_2$. Further, while the plastic component assembly incorporates the new locator pin 12 to eliminate a sink mark in the A face 30, it should be appreciated that the locator pin need not be utilized alone. The locator pin 12 could be utilized in conjunction with other sink reducing methods such as providing a texture to the A surface 30 or a thickening of the plastic at the region where the locator pin intersects the main body 11 of that component.

All such modifications and variations are within the scope of the appended claims when interpreted in accordance with the breadth to which they are fairly, legally and equitably entitled.

What is claimed:

1. A plastic component assembly, comprising:
   a first plastic workpiece including a locator pin having a main rib, a first secondary rib intersecting said main rib at a first intersection and a second secondary rib intersecting said main rib at a second intersection wherein said first intersection is offset from said second intersection; and
   a second plastic workpiece including a four sided clearance aperture receiving and holding said locator pin.

2. The plastic component assembly of claim 1, wherein said main rib includes a first face and a second face.

3. The plastic component assembly of claim 2, wherein said first secondary rib intersects said first face and said second secondary rib intersects said second face.

4. The plastic component assembly of claim 3, wherein said first secondary rib extends from said main rib in a first direction and said second secondary rib extends from said main rib in a second direction.

5. The plastic component assembly of claim 4, wherein said first direction is opposite said second direction.

6. The plastic component assembly of claim 5, wherein said first face is opposite said second face.

7. The plastic component assembly of claim 6, wherein said main rib has a width axis A, said first intersection extends along said width axis A for a length $L_1$, said second intersection extends along said width axis A for a length $L_2$ and said first intersection is spaced from said second intersection along said width axis A by a length $L_3$ where $L_3 > L_1 + L_2$.

* * * * *